(12) United States Patent
Choi et al.

(10) Patent No.: US 7,602,460 B2
(45) Date of Patent: Oct. 13, 2009

(54) LIQUID CRYSTAL DISPLAY DEVICE AND METHOD FOR FABRICATING THE SAME

(75) Inventors: Kee Seok Choi, Kumi-shi (KR); Sung Hak Jo, Seoul (KR)

(73) Assignee: LG Display Co., Ltd., Seoul (KR)

( * ) Notice: Subject to any disclaimer, the term of this patent is extended or adjusted under 35 U.S.C. 154(b) by 659 days.

(21) Appl. No.: 11/019,359

(22) Filed: Dec. 23, 2004

(65) Prior Publication Data

US 2005/0140856 A1  Jun. 30, 2005

(30) Foreign Application Priority Data

Dec. 27, 2003  (KR)  ........................ 10-2003-0098064

(51) Int. Cl.
*G02F 1/1333* (2006.01)
(52) U.S. Cl. .................. 349/106; 349/110; 349/141; 349/158; 349/187
(58) Field of Classification Search .................. 349/110, 349/106, 129, 141, 158, 187
See application file for complete search history.

(56) References Cited

U.S. PATENT DOCUMENTS

| | | | | |
|---|---|---|---|---|
| 6,067,140 | A * | 5/2000 | Woo et al. .................... | 349/129 |
| 6,583,836 | B2 * | 6/2003 | Kim et al. .................... | 349/129 |
| 6,583,846 | B1 * | 6/2003 | Yanagawa et al. ........... | 349/155 |
| 6,693,687 | B2 * | 2/2004 | Ohta et al. ................... | 349/110 |
| 6,833,897 | B2 * | 12/2004 | Lee et al. ..................... | 349/141 |
| 7,102,707 | B2 * | 9/2006 | Fujimaki et al. ............. | 349/106 |
| 7,126,660 | B2 * | 10/2006 | Woo ............................ | 349/141 |
| 7,202,929 | B2 * | 4/2007 | Ootsu et al. ................. | 349/141 |
| 2001/0010575 | A1 * | 8/2001 | Yoshida et al. .............. | 349/141 |
| 2003/0090608 | A1 * | 5/2003 | Kim et al. .................... | 349/110 |
| 2003/0168055 | A1 * | 9/2003 | Chae ........................... | 125/23.01 |
| 2003/0227586 | A1 * | 12/2003 | Okamoto et al. ............. | 349/106 |
| 2005/0078239 | A1 * | 4/2005 | Youn et al. ................... | 349/106 |
| 2005/0128404 | A1 * | 6/2005 | Lee .............................. | 349/141 |

FOREIGN PATENT DOCUMENTS

| | | |
|---|---|---|
| JP | 8-278498 A | 10/1996 |
| JP | 2003-43514 A | 2/2003 |

* cited by examiner

*Primary Examiner*—David Nelms
*Assistant Examiner*—Thanh-Nhan P Nguyen
(74) *Attorney, Agent, or Firm*—Birch, Stewart, Kolasch & Birch, LLP

(57) ABSTRACT

An LCD device and a method for fabricating the same is disclosed, to decrease step coverage in color filter layers of LCD devices having different models formed on one mother substrate, which includes first and second substrates facing each other, in which a plurality of pixel regions are defined; a first black matrix layer on the second substrate except the pixel regions, so as to prevent light leakage; a second black matrix layer on the center of each pixel region of the second substrate, so as to decrease step coverage of color filter layer; the color filter layer in each pixel region; and a liquid crystal layer between the first and second substrates.

11 Claims, 13 Drawing Sheets

LIQUID CRYSTAL DISPLAY DEVICE AND METHOD FOR FABRICATING THE SAME

The present invention claims the benefit of the Korean Patent Application No. 10-2003-098064, filed on Dec. 27, 2003, which is hereby incorporated by reference herein.

BACKGROUND OF THE INVENTION

1. Field of the Invention

The present invention relates to a liquid crystal display (LCD) device in general, and more particularly, to an LCD device and a method for fabricating the same, to decrease step coverage in color filter layers of LCD devices having different models formed on one mother substrate.

2. Discussion of the Related Art

Demands for various display devices have increased with development of an information society. Accordingly, many efforts have been made to research and develop various flat display devices such as liquid crystal displays (LCD), plasma display panels (PDP), electroluminescent displays (ELD), and vacuum fluorescent displays (VFD). Some species of flat display devices have already been applied to displays for various equipment.

Among the various flat display devices, liquid crystal display (LCD) devices have been most widely used due to advantageous characteristics, such as, for example, thin profile, lightness in weight, and low power consumption, whereby the LCD devices provide a substitute for Cathode Ray Tubes (CRT). In addition to mobile type LCD devices such, for example, as a display for a notebook computer, LCD devices have been developed for computer monitors and televisions to receive and display broadcasting signals.

Despite various technical developments in the LCD technology having applications in different fields, research in enhancing the picture quality of the LCD device has been, in some respects, lacking as compared to other features and advantages of the LCD device. In order to use LCD devices in various fields as a general display, the key to developing LCD devices depends on whether LCD devices can provide a high quality picture, including characteristics such as high resolution and high luminance with a large-sized screen, while still maintaining lightness in weight, thin profile, and low power consumption.

In general, an LCD device includes an LCD panel for displaying a picture image, and a driving part for applying a driving signal to the LCD panel. The LCD panel includes first and second substrates bonded to, and separated from each other at a predetermined interval, and a liquid crystal layer formed between the first and second glass substrates. To maintain the predetermined interval between the first and second substrates by spacers, the first and second substrates are bonded to each other by a sealant, and then the liquid crystal layer is formed between the first and second substrates. Meanwhile, alignment layers are respectively formed on opposite surfaces of the first and second substrates, and are rubbed to align the liquid crystal layer.

Hereinafter, a related art LCD device will be described with reference to the accompanying drawings.

FIG. 1 is a perspective view of a related art LCD device. As shown in FIG. 1, the related art LCD device includes a first substrate 1a, a second substrate 1b, and a liquid crystal layer 3. The first and second substrates 1a and 1b are bonded to each other at a predetermined interval, and the liquid crystal layer 3 is formed between the first and second substrates 1a and 1b by injection of liquid crystal.

In more detail, a plurality of gate lines G are formed on the first substrate 1a at fixed intervals in one direction, and the plurality of data lines D are formed at fixed intervals perpendicular to the plurality of gate lines G, thereby defining a plurality of pixel regions P (also referred to herein as unit pixel regions). In each of the pixel regions P, there is a pixel electrode 6 being overlapped with a predetermined portion of the gate line G of the adjacent pixel region P. Also, a plurality of thin film transistors T are formed at respective crossing portions of the plurality of gate and data lines, wherein each thin film transistor T is turned on/off by a scan signal of the gate line G so as to apply a data signal of the data line D to the corresponding pixel electrode 6. The second substrate 1b includes a black matrix layer 7 that excludes light from regions except the pixel regions P of the first substrate 1a, R/G/B color filter layers 8 corresponding to the pixel regions P to display various colors, and a common electrode 9 to obtain a picture image. In this state, alignment layers (not shown) are formed on opposite surfaces of the first and second substrates 1a and 1b, and are rubbed to align the liquid crystal layer 3.

In the related art, the thin film transistor T is comprised of a gate electrode projected from the gate line G, a gate insulating layer (not shown) on an entire surface of the first substrate 1a, an active layer formed on the gate insulating layer above the gate electrode, a source electrode projected from the data line D, and a drain electrode being opposite to the source electrode. Also, in the related art, the pixel electrode 6 is formed of a transparent conductive metal material having great transmittance, for example, indium-tin-oxide (ITO).

In the related art LCD device, the liquid crystal layer 3 is driven by a vertical electric field between the pixel electrode 6 of the first substrate 1a and the common electrode 9 of the second substrate 1b. This has the advantageous characteristics of great transmittance and high aperture ratio. However, it has the problem of a narrow viewing angle. Accordingly, in order to overcome the problem of the narrow viewing angle of the related art LCD device, an IPS mode LCD device using a parallel electric field to two substrates has been developed.

FIG. 2A is a plane view of a unit pixel region for a thin film transistor array substrate of a related art IPS mode LCD device. FIG. 2B is a plane view of a unit pixel region for a color filter array substrate of a related art IPS mode LCD device. FIG. 3 is a cross sectional view along I-I' of FIG. 2A and FIG. 2B.

As shown in FIG. 2 and/or FIG. 3, the related art IPS mode LCD device includes a first substrate 10a, a second substrate 10b, and a liquid crystal layer 80. On the first substrate 10a, a common electrode 50 and a pixel electrode 40 are formed in parallel. Also, a color filter layer 11 is formed on one surface of the second substrate 10b being opposite to the first substrate 10a. Then, the liquid crystal layer 80 is formed between the first and second substrates 10a and 10b.

In more detail, as shown in FIG. 2A and FIG. 3, the first substrate 10a includes a plurality of gate lines G, a plurality of data lines D, a plurality of thin film transistors T, a common line CL, a plurality of common electrodes 50, a plurality of pixel electrodes 40, and a storage electrode 15. At this time, the plurality of gate lines G are formed on the first substrate 10a, and the plurality of data lines D are formed perpendicular to the gate lines G, thereby defining a plurality of pixel regions. Also, the plurality of thin film transistors T are formed at respective crossing portions of the gate and data lines. Then, the common line CL is formed in parallel with the gate line G within the pixel region P. The plurality of common electrodes 50 are diverged from the common line CL, and are formed in parallel with the data line D. Furthermore, the pixel electrode 40 is connected with a drain electrode DE of the thin film transistor T, and is formed between each of the common electrodes 50 in parallel. The storage electrode 15 extending from the pixel electrode 40 is formed on the adjacent gate line G. Herein, the thin film transistor T further includes a gate electrode GE and a source electrode SE.

As shown in FIG. 2B and/or FIG. 3, the second substrate 10b includes a black matrix layer BM, color filter layers 11, and an overcoat layer OC. The black matrix layer BM is formed on an entire surface of the second substrate 10b except the pixel regions, and the color filter layers 11 are formed in correspondence with the pixel regions. Also an overcoat layer OC is formed on the entire surface of the second substrate 10b including the color filter layers 11, so as to decrease step coverage between the color filter layers of the adjacent pixel regions, and to prevent the color filter layers 11 from being contaminated by pigment.

In the aforementioned IPS mode LCD device, the liquid crystal layer 80 is driven by an electric field parallel to the two substrates, generated between the common electrode 50 and the pixel electrode 40 formed in parallel with the pixel region of the first substrate 10a.

A method for fabricating the color filter layer 11 of the second substrate 10b of the related art IPS mode LCD device will be described as follows.

FIG. 4A to FIG. 4C are cross sectional views of structures achieved by a fabrication process for the color filter layer of the related art IPS mode LCD device, which will be explained with reference to three pixel regions corresponding three color filter layers of R, G, and B.

First, as shown in FIG. 4A, the second substrate 10b, defined by repetitively forming the first, second, and third pixel regions, is prepared. Then, chrome or resin is deposited on the second substrate 10b, and is patterned by photolithography, thereby forming the black matrix layer BM on the entire surface of the second substrate 10b except the pixel regions.

Subsequently, as shown in FIG. 4B, red resist is coated on the entire surface of the second substrate 10b having the black matrix layer BM, and is patterned by photolithography, thereby forming a red color filter layer 11a in the first pixel region of the second substrate 10b.

Then, as shown in FIG. 4C, green resist is coated on the entire surface of the second substrate 10b having the red color filter layer 11a, and is patterned by photolithography, thereby forming a green color filter layer 11b in the second pixel region of the second substrate 10b.

After that, blue resist is coated on the entire surface of the second substrate 10b including the red and green color filter layers 11a and 11b, and is patterned by photolithography, thereby forming a blue color filter layer 11c in the third pixel region of the second substrate 10b.

Subsequently, the overcoat layer OC is formed on the entire surface of the second substrate 10b including the respective color filter layers 11a, 11b, and 11c, so as to decrease the step coverage of the respective color filter layers 11a, 11b and 11c. Traditionally, if a layer of material is to be deposited on top of a thin strip of material, step coverage is defined as the ratio of film thickness along the walls of the step to the film thickness at the bottom of the step. Applying this definition to FIG. 4, step coverage of the respective filter layers 11a, 11b and 11c is the structural thickness (in a vertical direction) difference of the respective color filter layers 11a, 11b, and 11c and the black matrix layer BM located between those respective color filter layers at the foot of the step.

Meanwhile, as each of the color filter layers 11a, 11b, and 11c becomes thicker, and the step coverage of the color filter layers 11a, 11b, and 11c (i.e., structural thickness difference (in the vertical direction) between the color filter layers 11a, 11b, and 11c and the black matrix layer BM located between the respective color filter layers) becomes larger, it is required to thicken the overcoat layer OC. Thus, the transmittance of the IPS mode LCD device is lowered. In the process for forming the respective color filter layers 11a, 11b, and 11c, it is important to decrease the thickness in each of the color filter layers 11a, 11b, and 11c, and to minimize the step coverage of the respective color filter layers 11a, 11b, and 11c.

To improve productivity of the fabrication process for the LCD device, instead of forming one LCD panel on one mother glass substrate, a plurality of LCD panels are formed on one mother glass substrate at the same time. Also, a plurality of LCD panels of the same model may be formed on one mother glass substrate. Or, a plurality of LCD panels of the different models may be formed on one mother glass substrate. Before injecting liquid crystal, the mother glass substrate may be cut into the unit LCD panels. Then, the fabrication process is performed with respect to each of the LCD panels.

In case the LCD panels have different models, unit pixel regions of the respective LCD panels may have different sizes. Also, even though the LCD panels have the same size, the unit pixel regions of the LCD panels may have different sizes according to resolution.

FIG. 5 is a plane view of a multi-model LCD device for designing a plurality of LCD panels of the different models on one mother substrate.

For example, as shown in FIG. 5, on the assumption that first, second, and third LCD panels 60a, 60b, and 60c of different models are formed on one mother substrate 60, a black matrix layer and a color filter layer are formed on each portion corresponding to the respective LCD panels 60a, 60b, and 60c.

If, for example, the first LCD panel 60a has a low resolution, and the second LCD panel 60b has a high resolution, then the unit pixel region of the first LCD panel 60a having the low resolution is larger than the unit pixel region of the second LCD panel 60b having the high resolution. Thus, the thickness of pigment for the color filter layer 70a formed in the unit pixel region of the first LCD panel 60a having the low resolution is different from the thickness of pigment for the color filter layer 70b of the unit pixel region of the second LCD panel 60b having the high resolution, thereby generating step coverage between the color filter layers 70a and 70b of the different models.

That is, as shown in (a) of FIG. 5, the color filter layer 70a formed in the unit pixel region of the first LCD panel 60a having a low resolution is thinner than a color filter layer 70b formed in the unit pixel region of the second LCD panel 60b having the high resolution. Accordingly, the completed LCD devices may have the different chromatic coordinates.

As described above, the IPS mode LCD device has a thick overcoat layer OC so as to decrease the step coverage between the color filter layers 70a and 70b. However, as the overcoat layer OC becomes thicker, the transmittance is lowered.

SUMMARY OF THE INVENTION

Accordingly, the present invention is directed to an LCD device and a method for fabricating the same that obviate one or more problems due to limitations and disadvantages of the related art.

An object of the present invention is to provide an LCD device and a method for fabricating the same, to decrease step coverage between a color filter layer of a first model having a small-sized unit pixel region and a color filter layer of a second model having a large-sized unit pixel region, by additionally forming a black matrix layer on the center of the unit pixel region of the second model having the large-sized unit pixel region.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure of an exemplary embodiment of the invention particularly pointed out in the written description and claims hereof as well as the appended drawings.

To achieve these objects and other advantages and in accordance with the purpose of the invention, as embodied and broadly described herein, exemplary embodiments of liquid crystal display (LCD) devices include first and second substrates facing each other, in which a plurality of pixel regions are defined; a first black matrix layer on the second substrate except the pixel regions, so as to prevent light leakage; a second black matrix layer on the center of each pixel region of the second substrate, so as to decrease step coverage of color filter layer; the color filter layer in each pixel region; and a liquid crystal layer between the first and second substrates.

In various exemplary embodiments of the invention, the second black matrix layer is formed as one body with the first black matrix layer.

In addition, in various exemplary embodiments of the invention, the LCD device includes a common electrode on an entire surface of the second substrate including the first and second black matrix layers and the color filter layer.

Furthermore, in various exemplary embodiments of the invention, the LCD device includes an overcoat layer on the entire surface of the second substrate including the first and second black matrix layers and the color filter layer.

Also, in various exemplary embodiments of the invention, the first substrate includes a plurality of gate and data lines crossing each other to define the plurality of pixel regions; a plurality of thin film transistors at respective crossing portions of the plurality of gate and data lines; a plurality of common electrodes in each pixel region; and a plurality of pixel electrodes connected with a drain electrode of the thin film transistor and formed between the common electrodes in parallel.

Also, in various exemplary embodiments of the invention, the second black matrix layer is formed on the second substrate corresponding to the common electrode.

In various exemplary embodiments of the invention, a liquid crystal display (LCD) device includes first and second substrates in which LCD panels of first and second models are designed, the first model having a plurality of first pixel regions, the second model having a plurality of second pixel region, wherein the first pixel region is larger than the second pixel region; a first black matrix layer on the second substrate for the first and second models except the pixel regions; a second black matrix layer on the center of each first pixel region of the second substrate; and a color filter layer on the second substrate of the pixel regions for the first and second models.

In various exemplary embodiments of the invention, a method for fabricating an LCD device includes steps of preparing first and second substrates in which a plurality of pixel regions are defined; forming a first black matrix layer on the second substrate except the pixel regions, and a second black matrix layer on the center of each pixel region of the second substrate; forming a color filter layer in each pixel region of the second substrate; and forming a liquid crystal layer between the first and second substrates.

In various exemplary embodiments of the invention, a method for fabricating an LCD device forming LCD panels of a first model for a large-sized unit pixel region, and of a second model for a small-sized unit pixel region, on the same substrate, includes steps of preparing first and second substrates in which a plurality of pixel regions are defined; forming a first black matrix layer on the second substrate except the pixel regions in the portion for the LCD panels of the first and second models, and a second black matrix layer on the center of each pixel region in the portion for the LCD panel of the first model; forming a color filter layer in each pixel region of the first and second models; bonding the first and second substrates to each other; cutting the bonded first and second substrates into the LCD panels of the first and second models; and forming a liquid crystal layer between the first and second substrates in each of the cut LCD panels.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Hereinafter, an LCD device according to the present invention will be described with reference to the accompanying drawings.

Figure 6A:
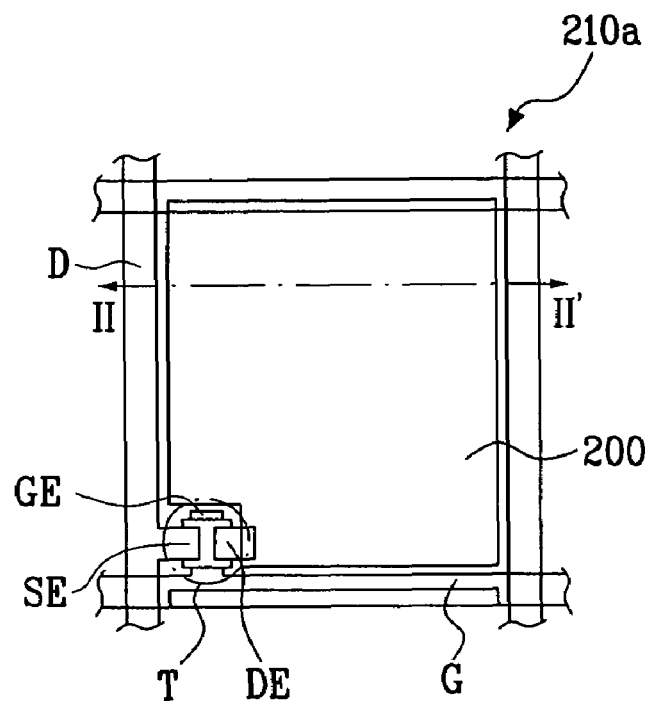
FIG. 6A and FIG. 6B are plane views of a thin film transistor array substrate and a color filter array substrate for a unit pixel region of one model having the largest unit pixel region of one glass multi model according to a first exemplary embodiment of the present invention.
Figure 6B:
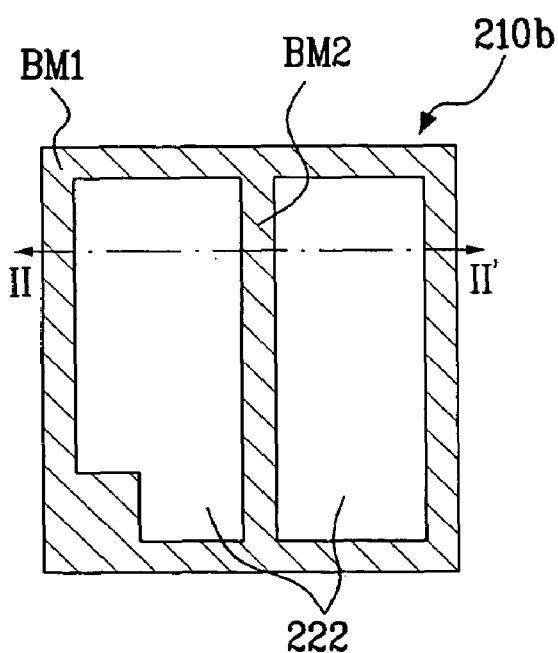
Figure 7:
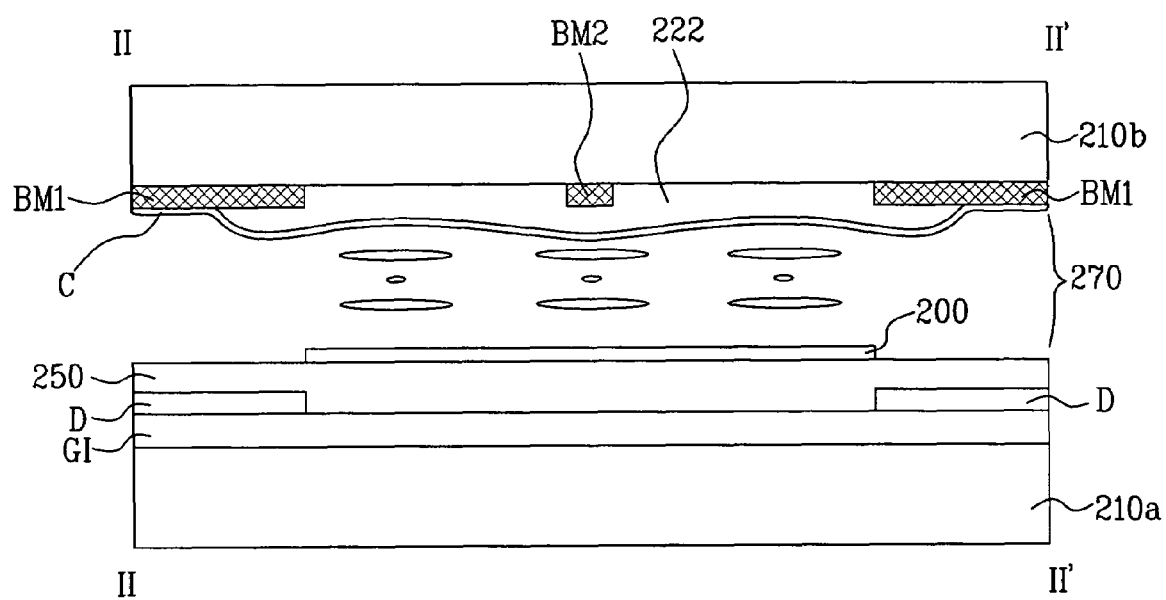
FIG. 7 is a cross sectional view along II-II' of FIG. 6A and FIG. 6B.

FIG. 6A and FIG. 6B are plane views of a thin film transistor array substrate and a color filter array substrate for a unit pixel region of one model having the largest unit pixel region of one glass multi-model according to a first exemplary embodiment of the present invention. FIG. 7 is a cross-sectional view along II-II' of FIG. 6A and FIG. 6B. Although one unit pixel region is shown and discussed below, an LCD device has a plurality of such unit pixel regions having a plurality of gate lines, data lines, and thin film transistors, all operatively coupled.

As shown in FIG. 6A, FIG. 6B, and/or FIG. 7, an LCD device according to the first exemplary embodiment of the present invention includes a first substrate 210a, a second substrate 210b, and a liquid crystal layer 270. The first and second substrates 210a and 210b are opposite to each other at a predetermined interval therebetween, and the liquid crystal layer 270 is formed between the first and second substrates 210a and 210b.

Also, as shown in FIG. 6A and/or FIG. 7, the first substrate 210a includes a gate line G and a data line D crossing each other to define a unit pixel region, and a thin film transistor T at a crossing portion of the gate and data lines G and D so as to transmit a data signal of the data line D to a corresponding pixel electrode 200 dependent on a scan signal of the gate line G. Herein, the thin film transistor T is comprised of a gate electrode GE, a gate insulating layer GI, a source electrode SE, and a drain electrode DE. In addition, reference number 250 denotes a protective layer.

As shown in FIG. 6B and/or FIG. 7, the second substrate 210b includes a first black matrix layer BM1, a second black matrix layer BM2, a color filter layer 222, and a common electrode C. As a result, the first black matrix layer BM1 is formed in the portion of the second substrate 210b except the pixel regions so as to prevent light leakage therein. Also, the second black matrix layer BM2 is formed on the center of the unit pixel region on the second substrate 210b so as to decrease step coverage of the color filter layer 222 formed in the pixel region. Then, the color filter layer 222 is formed in the pixel region, and the common electrode C is formed on the entire surface of the second substrate 210b including the color filter layer 222.

The second black matrix layer BM2 of the second substrate 210b is formed as one with and to extend from the first black matrix layer BM1 by using known patterning processes. Also, the second black matrix layer BM2 is formed on the center of the unit pixel region of the second substrate 210b, thereby preventing the central portion of the color filter layer 222 formed in the unit pixel region from being hollowed, i.e., from having a concave or sunken surface. Accordingly, it is possible to obtain the same step coverage between the color filter layer 222 formed in the pixel region of the LCD device having the large-sized unit pixel region and another color filter layer formed in an LCD device of the different model having a small-sized unit pixel region. Although not shown, in the portion for the LCD device of the model having the small-sized unit pixel region, an LCD panel may only have the first black matrix layer BM1 without the second black matrix layer BM2.

A method for fabricating the LCD device according to the first exemplary embodiment of the present invention will be described in detail, which will be explained with reference to three pixel regions corresponding three color filter layers of R, G, and B.

FIG. 8A to FIG. 8D are cross sectional views of structures achieved by a fabrication process for the LCD device according to the first exemplary embodiment of the present invention.

First, as explained above, on the first substrate 210a, the plurality of gate lines G are formed in one direction at fixed intervals, and the plurality of data lines D are formed in perpendicular to the gate lines G at fixed intervals. Then, the pixel electrode 200 is formed in each pixel region (unit pixel region), wherein the pixel electrode 200 is overlapped with one portion of the gate line G of the adjacent pixel region. Also, the plurality of thin film transistors T are formed at the respective crossing portions of the plurality of gate and data lines, wherein each thin film transistor T is turned on/off by the scan signal of the corresponding gate line G so as to apply the data signal of the corresponding data line D to the corresponding pixel electrode 200. Herein, the thin film transistor T is comprised of the gate electrode GE, the source electrode SE, and the drain electrode DE.

An exemplary method for fabricating the second substrate is described as follows.

Figure 8A:
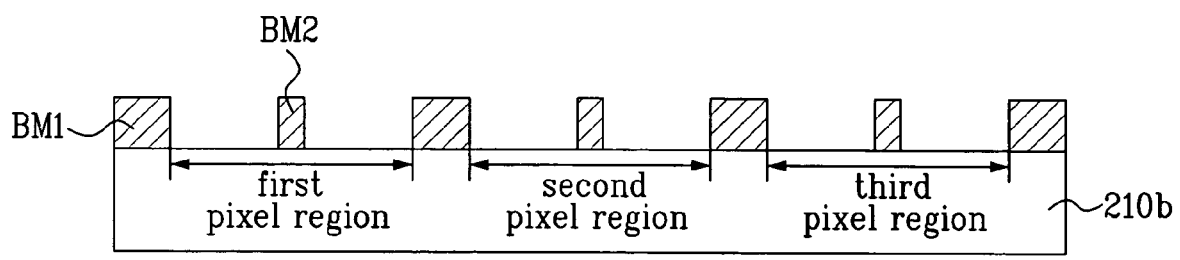
FIG. 8A to FIG. 8D are cross sectional views of structures achieved by a fabrication process for an LCD device according to a first exemplary embodiment of the present invention.

As shown in FIG. 8A, chrome or resin is deposited on the entire surface of the second substrate 210b, and is patterned by photolithography, thereby forming the first black matrix layer BM1 on the entire surface of the second substrate 210b except the pixel regions, and simultaneously forming the second black matrix layer BM2 on the center of the unit pixel region in the portion for the LCD panel having the large-sized unit pixel region. That is, the black matrix structure (BM1 and BM2) of FIG. 6B is formed at each unit pixel region (or selected unit pixel regions) of the LCD device. As a result, the second black matrix layer BM2 is connected with the first black matrix layer BM1.

Although not shown, in the portion for the LCD panel of the model having the small-sized unit pixel region, the LCD panel has only the first black matrix layer BM1 without the second black matrix layer BM2. That is, a mask for the black matrix layer is patterned to form the second black matrix layer in the portion for the LCD panel having the large-sized unit pixel region, but not to form the second black matrix layer in the portion for the LCD panel having the small-sized unit pixel region.

Figure 8B:
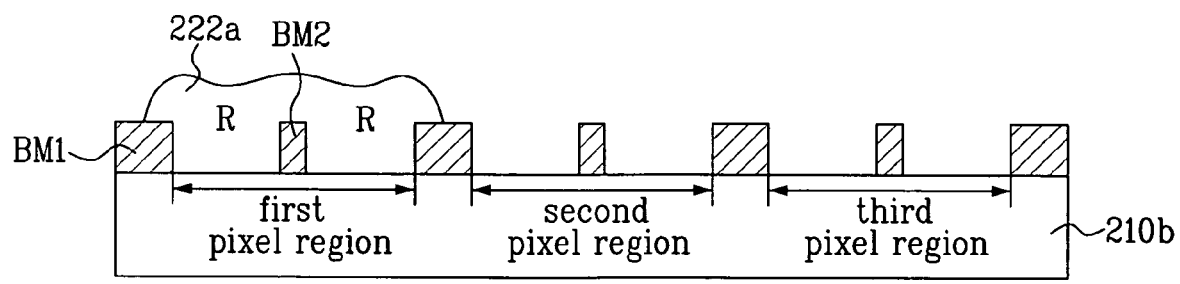

After that, as shown in FIG. 8B, red resist or resin is coated on the entire surface of the second substrate 210b including the first and second black matrix layers BM1 and BM2, and is patterned by photolithography, thereby forming a red color filter layer 222a in the first pixel region so as to cover the second black matrix layer BM2. As a result, in the portion for the LCD panel having the large-sized unit pixel region, it is possible to prevent the central portion of the red color filter layer 222a from being hollowed, i.e., from having a concave or sunken surface, by forming the second black matrix layer BM2 in the first pixel region.

Figure 8C:
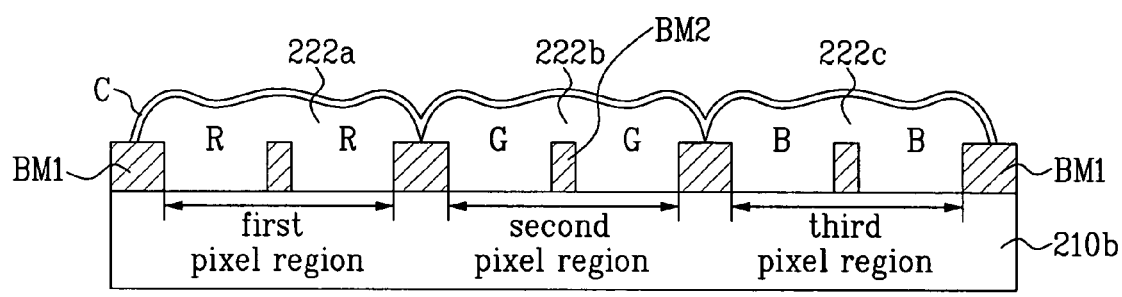

Subsequently, as shown in FIG. 8C, green resist or resin is coated on the entire surface of the second substrate 210b including the red color filter layer 222a formed in the first pixel region, and is patterned by photolithography, thereby forming a green color filter layer 222b in the second pixel region so as to cover the second black matrix layer BM2. As a result, in the portion for the LCD panel having the large-sized unit pixel region, it is possible to prevent the central portion of the green color filter layer 222b from being hollowed, i.e., from having a concave or sunken surface, by forming the second black matrix layer BM2 in the second pixel region, so that the green color filter layer 222b is maintained evenly.

Next, blue resist or resin is coated on the entire surface of the second substrate 210b including the red color filter layer of the first pixel region, and the green color filter layer 222b of the second pixel region, and is patterned by photolithography, thereby forming a blue color filter layer 222c in the third pixel region so as to cover the second black matrix layer BM2. As a result, in the portion for the LCD panel having the large-sized unit pixel region, it is possible to prevent the central portion of the blue color filter layer 222c from being hollowed, i.e., from having a concave or sunken surface, by forming the second black matrix layer BM2 in the third pixel region, so that the blue color filter layer 222c is maintained evenly.

Then, the common electrode C is formed on the entire surface of the second substrate 210b having the red, green, and blue color filter layers 222a, 222b, and 222c.

Figure 1:
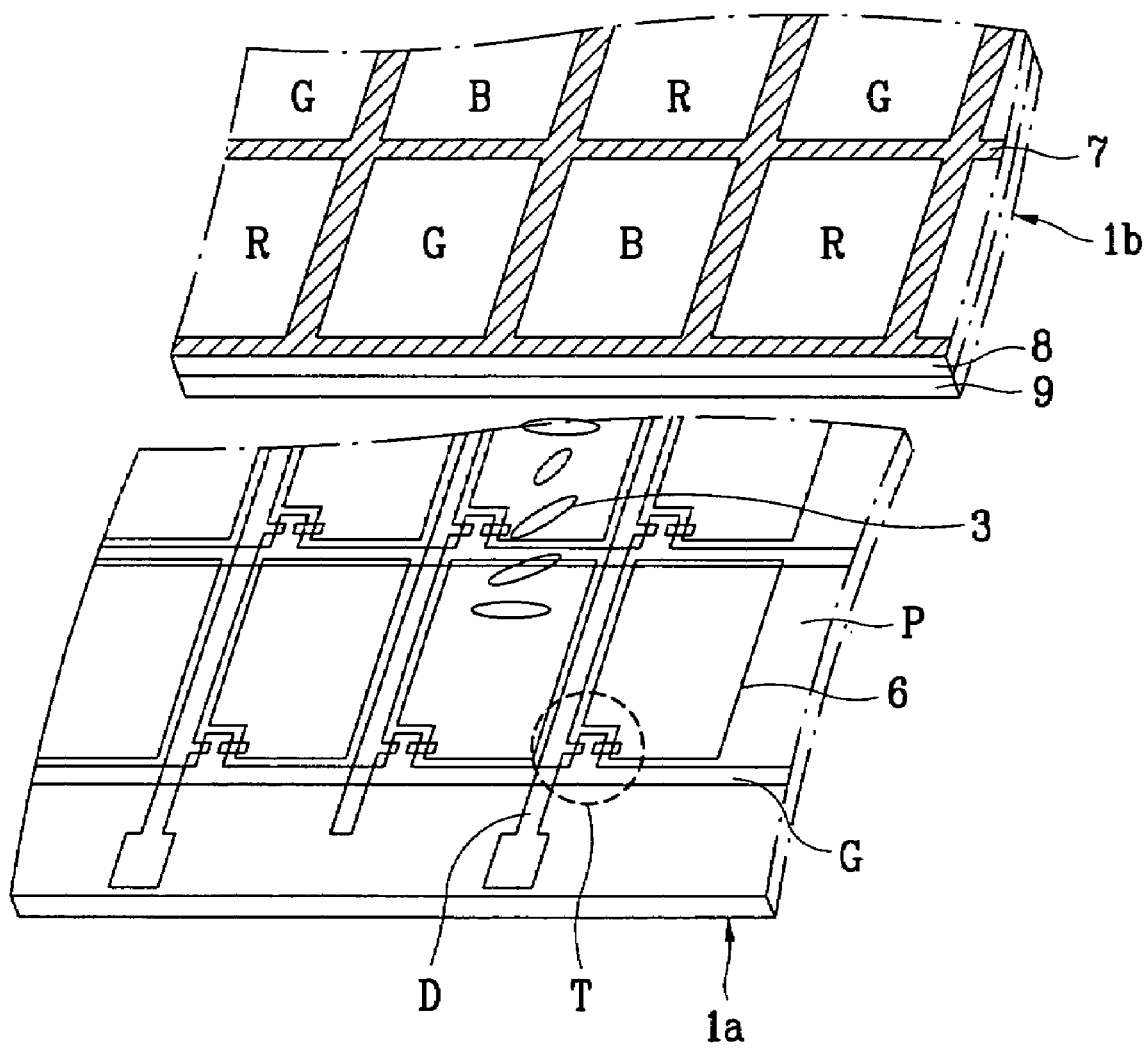
FIG. 1 is a perspective view of a related art LCD device.
Figure 2A:
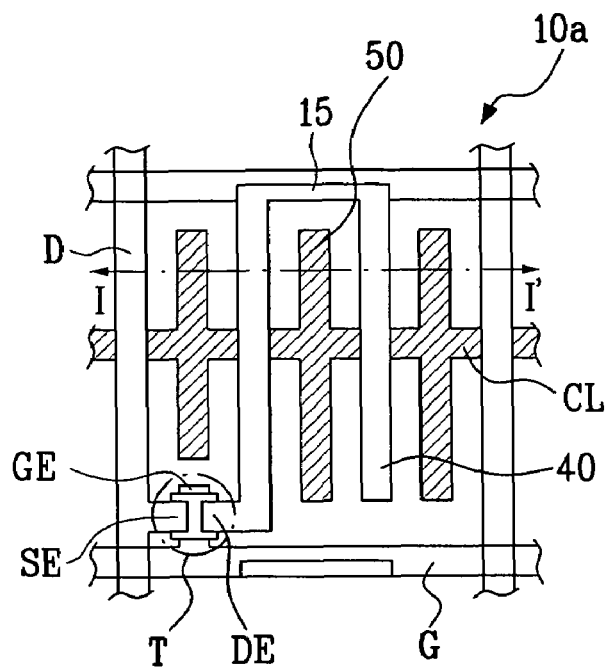
FIG. 2A and FIG. 2B are plane views of a thin film transistor array substrate and a color filter array substrate for a unit pixel region of a related art IPS mode LCD device.
Figure 2B:
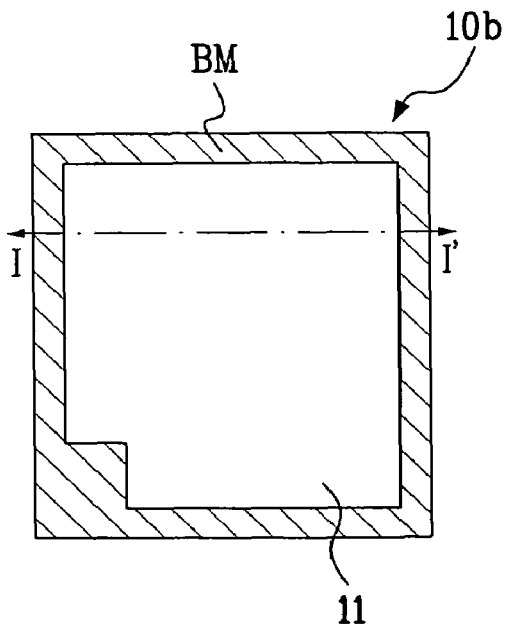
Figure 3:
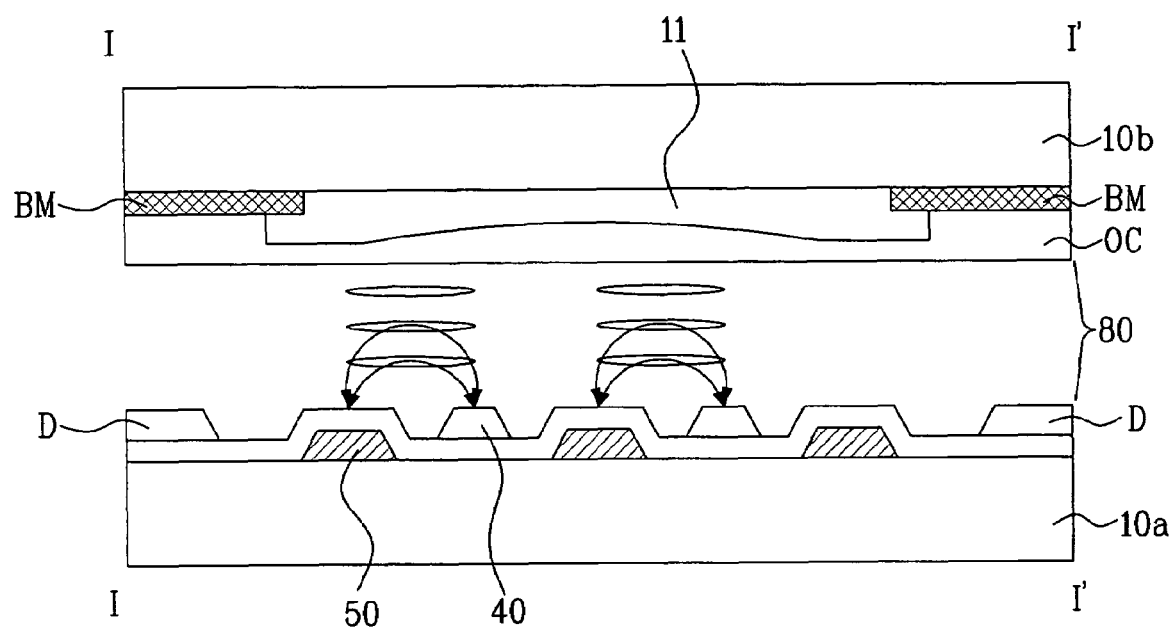
FIG. 3 is a cross sectional view along I-I' of FIG. 2A and FIG. 2B.
Figure 4A:
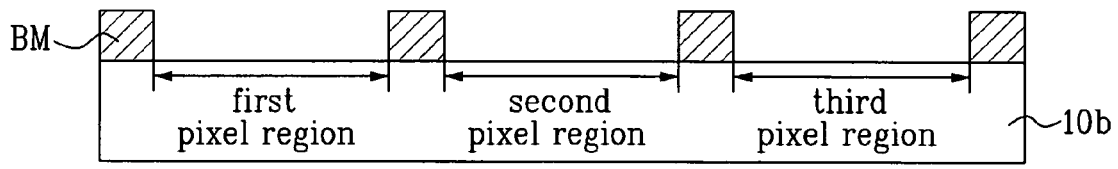
FIG. 4A to FIG. 4C are cross sectional views of structures achieved by a fabrication process for a color filter layer of a related art IPS mode LCD device.
Figure 4B:
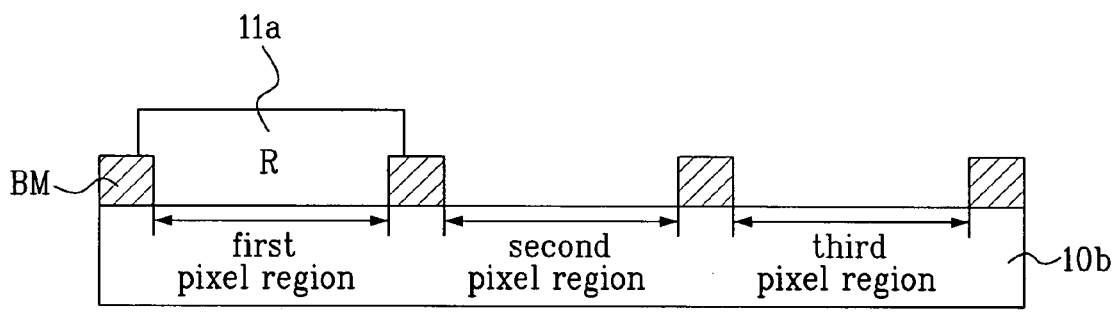
Figure 4C:
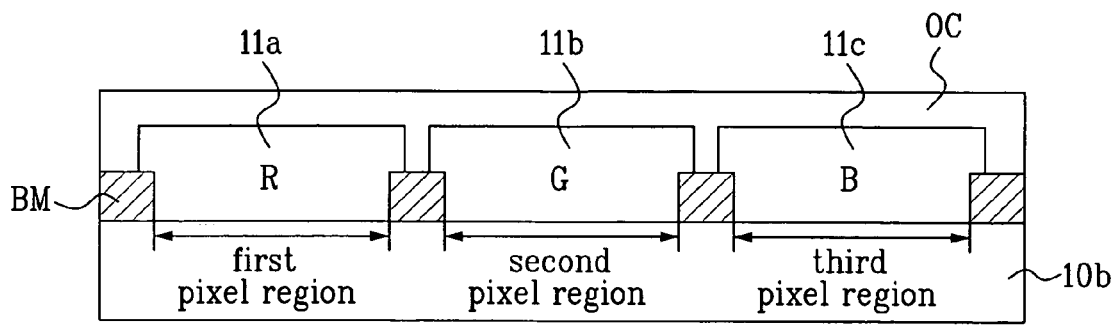
Figure 5:
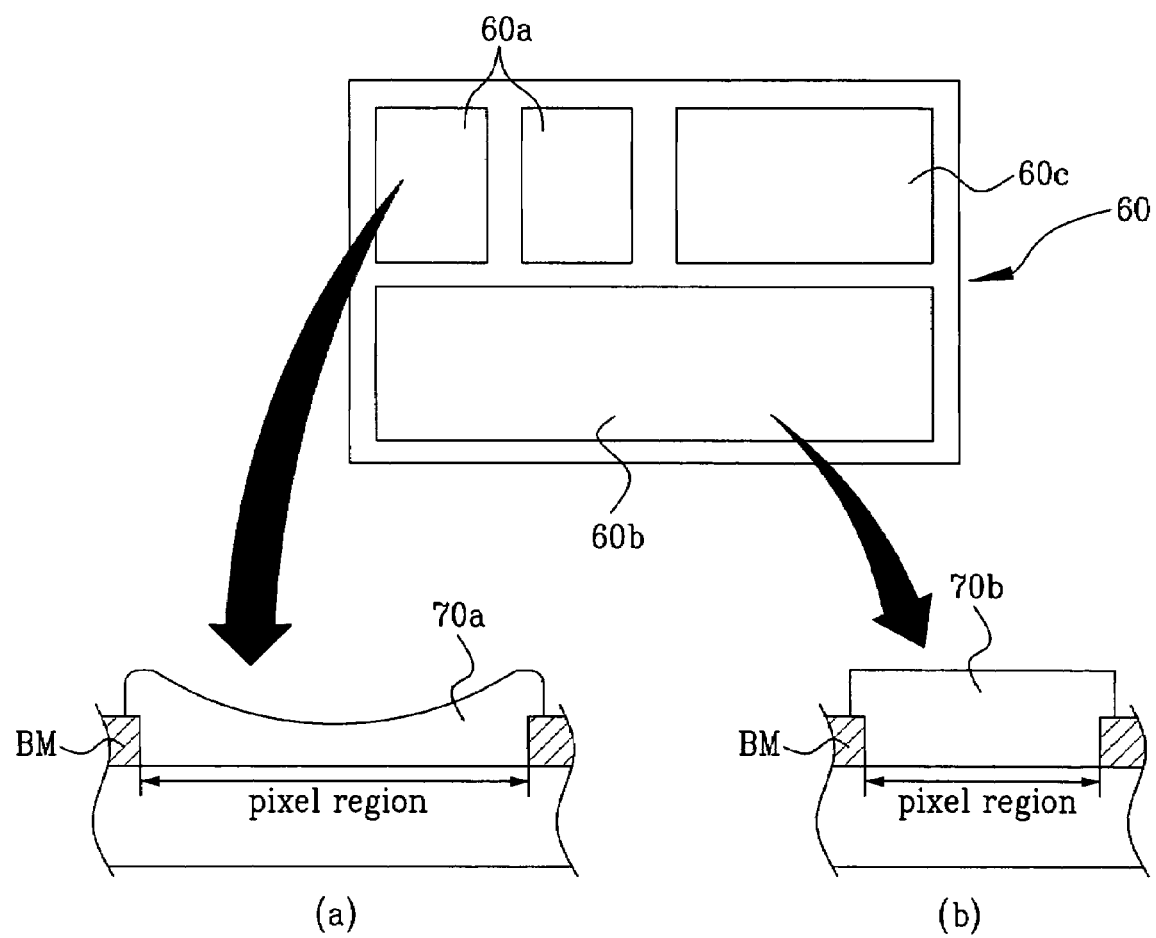
FIG. 5 is a plane view of a multi-model LCD device for designing a plurality of LCD panels of the different models on one mother substrate.
Figure 8D:
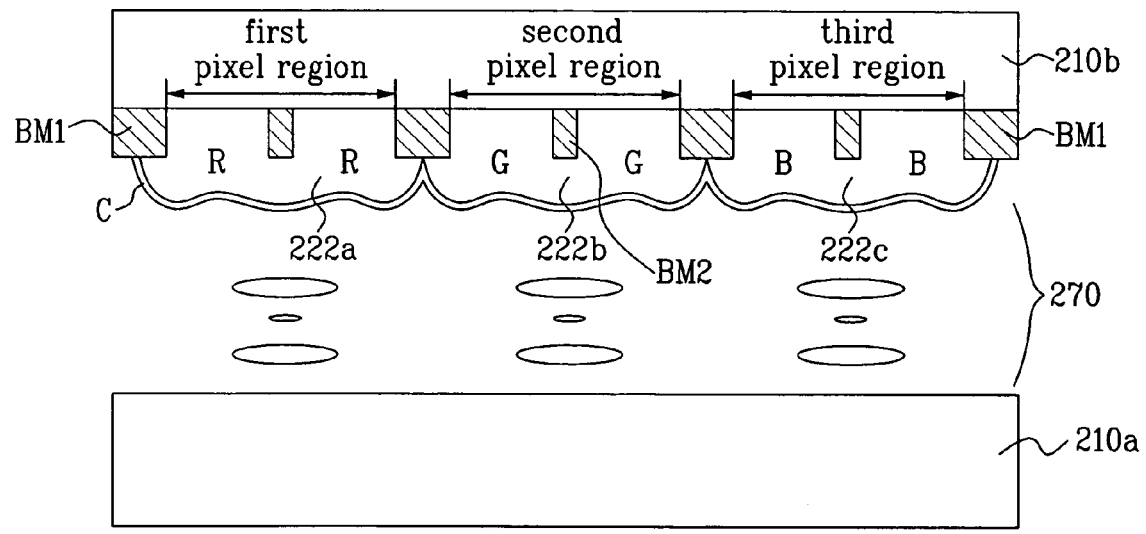

Next, as shown in FIG. 8D, the completed first and second substrates 210a and 210b are bonded to each other, and then the bonded first and second substrates 210a and 210b are cut into the unit LCD panels of the respective models. e.g. differently sized models similar to the models as shown in FIG. 5. After that, the liquid crystal layer 270 is formed between the first and second substrates 210a and 210b in each of the LCD panels, thereby completing the LCD device.

As explained above, in the LCD device according to the first embodiment of the present invention, the LCD panel of the large-sized unit pixel region has the thick color filter layers 222a, 222b, and 222c due to the second black matrix layer BM2, so that the thickness difference is not generated or is minimized between the color filter layer of the LCD panel having the large-sized unit pixel region and the color filter layer of the LCD panel having the small-sized unit pixel region. However, in case of the LCD panel having the large-sized unit pixel region, an aperture ratio is lowered due to the second black matrix layer BM2.

In order to overcome this problem of the LCD device according to the first embodiment of the present invention, another LCD device according to the second embodiment of the present invention has been proposed.

Figure 9A:
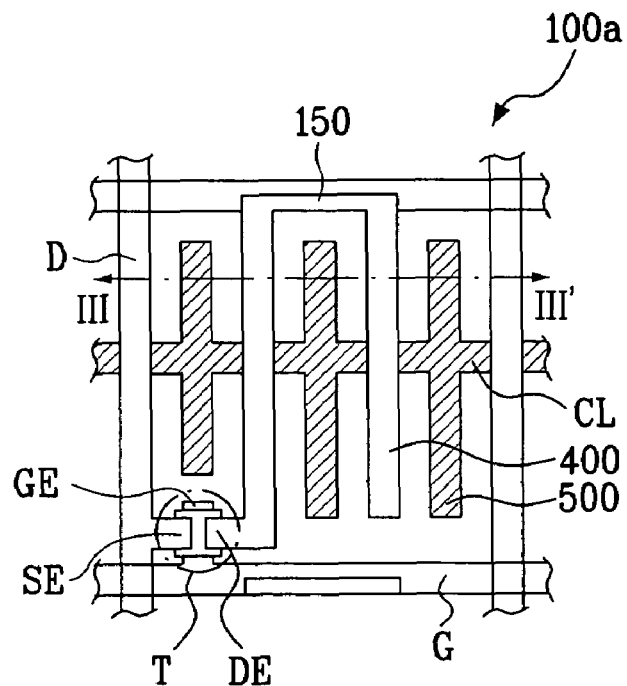
FIG. 9A and FIG. 9B are plane views of a thin film transistor array substrate and a color filter array substrate for a unit pixel region of one model having the largest unit pixel region of one glass multi model according to a second exemplary embodiment of the present invention.
Figure 9B:
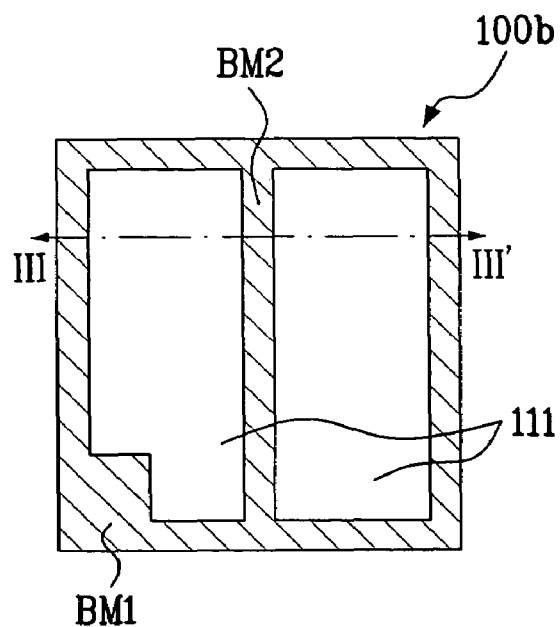
Figure 10:
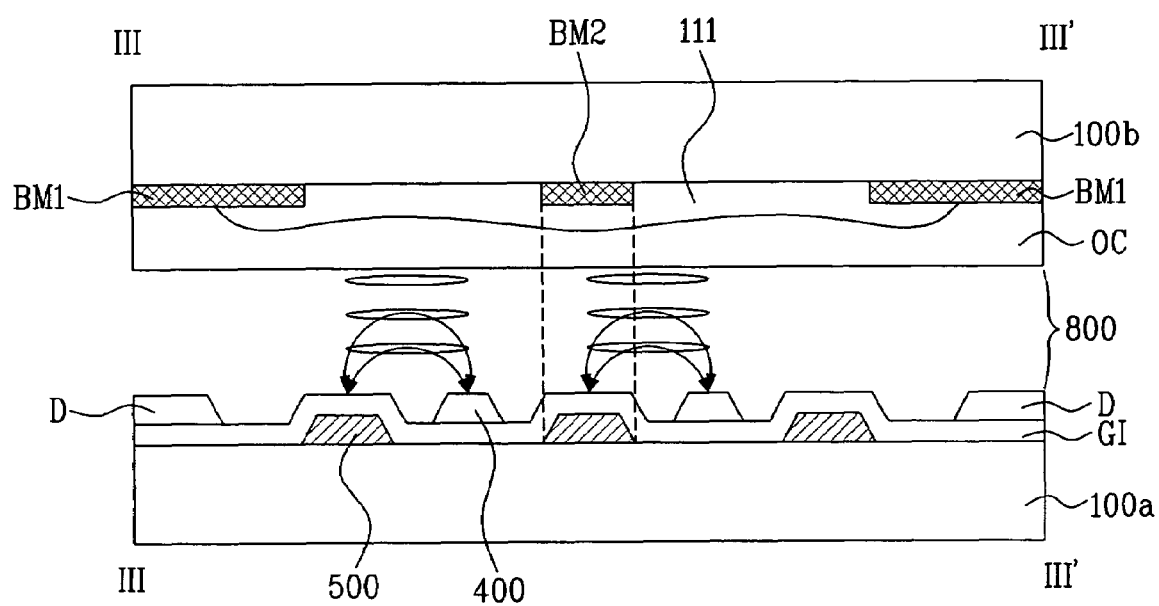
FIG. 10 is a cross sectional view along III-III' of FIG. 9A and FIG. 9B.

FIG. 9A and FIG. 9B are plane views of a thin film transistor array substrate and a color filter array substrate for a unit pixel region of one model having the largest pixel region of one glass multi model according to the second exemplary embodiment of the present invention. FIG. 10 is a cross-sectional view along III-III' of FIG. 9A and FIG. 9B.

As shown in FIG. 9A, FIG. 9B, and FIG. 10, an LCD device according to the second embodiment of the present invention includes a first substrate 100a, a second substrate 100b, and a liquid crystal layer 800. As a result, the first and second substrates 100a and 100b are bonded to each other at a predetermined interval, and the liquid crystal layer 800 is formed between the first and second substrates 100a and 100b by injection of liquid crystal.

In more detail, the first substrate 100a includes a plurality of gate lines G, a plurality of data lines D, a plurality of thin film transistors T, a common line CL, a plurality of common electrodes 500, a plurality of pixel electrodes 400, and a storage electrode 150. As a result, the plurality of gate lines G are formed on the first substrate 100a, and the plurality of data lines D are formed in perpendicular to the gate lines G, thereby defining a plurality of pixel regions. Also, the plurality of thin film transistors T are formed at respective crossing portions of the gate and data lines. Then, the common line CL is formed in parallel with the gate line G within the pixel region P. The plurality of common electrodes 500 are diverged from the common line CL, and are formed in parallel with the data line D. Furthermore, the pixel electrode 400 is connected with a drain electrode DE of the thin film transistor T, and is formed between each of the common electrodes 500 in parallel. The storage electrode 150 extending from the pixel electrode 400 is formed on the gate line G. Herein, the thin film transistor T further includes a gate electrode GE, a gate-insulating layer GI, a source electrode SE, and the drain electrode DE.

Meanwhile, as shown in FIG. 9B and FIG. 10, the second substrate 100b of the LCD panel of the model having the large-sized unit pixel region includes a first black matrix layer BM1, a second black matrix layer BM2, a color filter layer 111, and an overcoat layer OC. As a result, the first black matrix layer BM1 is formed on the second substrate 100b except the pixel regions so as to prevent light leakage. Also, the second black matrix layer BM2 is formed on the center of the unit pixel region of the second substrate 210b, so as to decrease the step coverage of the color filter layer. Also, the color filter layer 111 is formed in the pixel region, and the overcoat layer OC is formed on an entire surface of the second substrate 100b including the color filter layer 111.

The second black matrix layer BM2 of the second substrate 100b is formed as one with and extends from the first black matrix layer BM1 by using known patterning processes, and the second black matrix layer BM2 is formed in the center of the unit pixel region, thereby preventing the central portion of the color filter layer formed in the pixel region 111 from being hollowed, i.e., from having a concave or sunken surface.

Accordingly, the color filter layer 111 formed in the portion corresponding to the LCD panel having the large-sized pixel region has the same step coverage as the color filter layer formed in the portion corresponding to the LCD panel having the small-sized pixel region.

Although not shown, the LCD panel of the model having the small-sized unit pixel region may include only the first black matrix layer BM1 without the second black matrix layer BM2.

At this time, as shown in FIG. 10, preferably, the second black matrix layer BM2 is formed on the second substrate 100b in correspondence with the common electrode 500 formed on the first substrate 100a. That is, the second black matrix layer BM2 is formed in the center of the unit pixel region, whereby it has an effect on an aperture ratio of the pixel region. In this respect, the second black matrix layer BM2 is formed on the second substrate 100b in correspondence with the common electrode 500 occupying the aperture ratio of the pixel region, so that it is possible to prevent the aperture ratio from being lowered.

A method for fabricating the LCD device according to the second embodiment of the present invention will be described as follows.

FIG. 11A to FIG. 11D are cross sectional views of the fabrication process for the LCD device according to a second exemplary embodiment of the present invention, which will be explained with reference to the first, second, and third pixel regions corresponding the three color filter layers of R, G, and B.

First, as explained above, the first substrate 100a includes the plurality of gate lines G, the plurality of data lines D, the plurality of thin film transistors T, the common line CL, the plurality of common electrodes 500, the plurality of pixel electrodes 400, and the storage electrode 150. As a result, the plurality of gate lines G are formed on the first substrate 100a, and the plurality of data lines D are formed perpendicular to the gate lines G, thereby defining a plurality of pixel regions. Also, the plurality of thin film transistors T are formed at the respective crossing portions of the gate and data lines. Then, the common line CL is formed in parallel with the gate line G within the pixel region P. The plurality of common electrodes 500 are diverged from the common line CL, and are formed in parallel with the data line D. Furthermore, the pixel electrode 400 is connected with the drain electrode DE of the thin film transistor T, and is formed between each of the common electrodes 500 in parallel. The storage electrode 150 extending from the pixel electrode 400 is formed on the gate line G.

An exemplary method for fabricating the second substrate 100b will be described in detail.

Figure 11A:
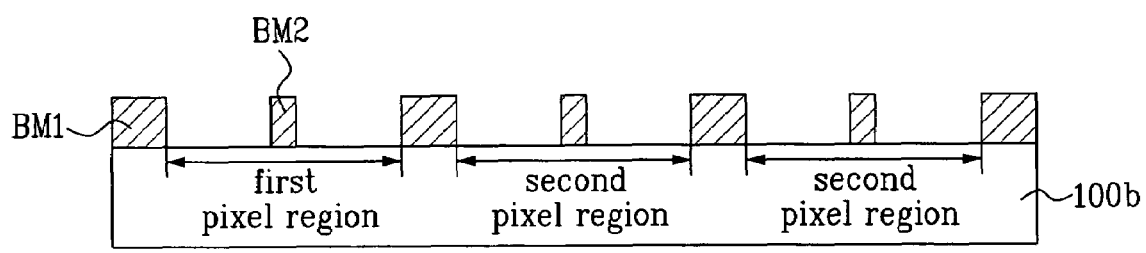
FIG. 11A to FIG. 11D are cross sectional views of structures achieved by a fabrication process for an LCD device according to the second exemplary embodiment of the present invention.

As shown in FIG. 11A, chrome or resin is deposited on the entire surface of the second substrate 10b, and is patterned by photolithography, thereby simultaneously forming the first black matrix layer BM1 and the second black matrix layer BM2. As a result, the first black matrix layer BM1 is formed on the entire surface of the second substrate 100b except the pixel regions in the portion corresponding to the LCD panel of the model having the large-sized unit pixel region, and the second black matrix layer BM2 is formed on the center of the unit pixel region of the second substrate 100b, wherein the second black matrix layer BM2 is connected with the first black matrix layer BM1. Also, the second black matrix layer BM2 is formed on the second substrate 100b corresponding to the common electrode 500 of the first substrate 100a, thereby preventing the aperture ratio of the pixel region from being lowered.

Although not shown, in case of the portion for the LCD panel of the model having the small-sized unit pixel region, the LCD panel may have only the first black matrix layer BM1 without the second black matrix layer BM2. That is, a mask for the black matrix layer is patterned to form the second black matrix layer in the portion for the LCD panel having the large-sized unit pixel region, and not to form the second black matrix layer in the portion for the LCD panel having the small-sized unit pixel region.

Figure 11B:
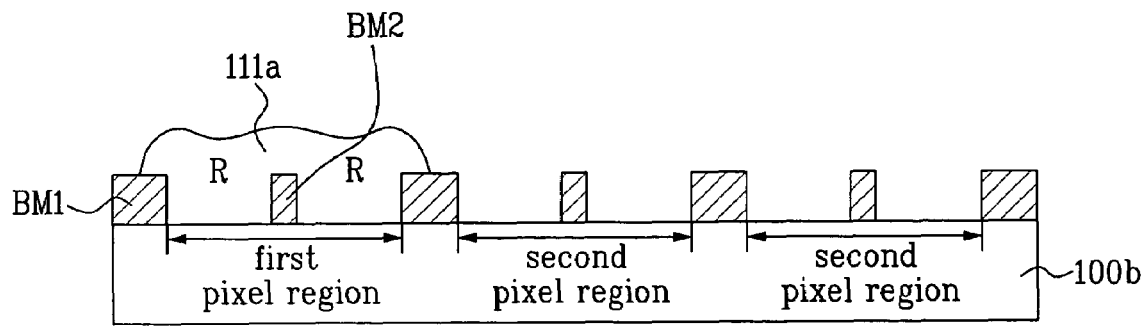

As shown in FIG. 11B, red resist or resin is coated on the entire surface of the second substrate 100b including the first and second black matrix layers BM1 and BM2, thereby forming a red color filter layer 111a in the first pixel region. In the portion corresponding to the LCD panel of the mode having the large-sized unit pixel region, the red color filter layer 111a is formed to cover the second black matrix layer BM2 of the first pixel region. Thus, the second black matrix layer BM2 is formed in the center of the first pixel region, so that it is possible to prevent the central portion of the red color filter layer 111a from being hollowed, i.e., from having a concave or sunken surface.

Figure 11C:
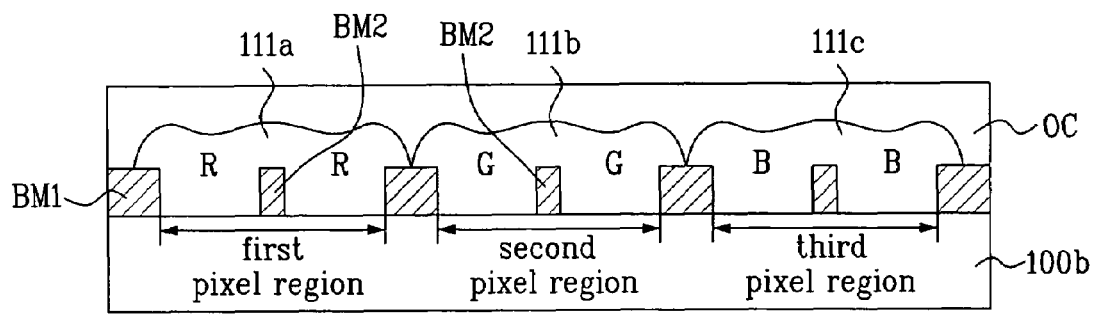

As shown in FIG. 11C, green resist or resin is coated on the entire surface of the second substrate 100b including the red color filter layer 111a of the first pixel region, and is patterned by photolithography, thereby forming a green color filter layer 111b in the second pixel region. In the portion corresponding to the LCD panel of the mode having the large-sized unit pixel region, the green color filter layer 111b is formed to cover the second black matrix layer BM2 of the second pixel region. Thus, the second black matrix layer BM2 is formed in the center of the second pixel region, so that it is possible to prevent the central portion of the green color filter layer 111b from being hollowed, i.e., from having a concave or sunken surface.

Then, blue resist or resin is coated on the entire surface of the second substrate 100b including the red color filter layer 111a of the first pixel region and the green color layer 111b of the second pixel region, and is patterned by photolithography, thereby forming a blue color filter layer 111c in the third pixel region to cover the second black matrix layer BM2. As a result, it is possible to prevent the central portion of the blue color filter layer 111c from being hollowed, i.e., from having a concave or sunken surface, by forming the second black matrix layer BM2.

Subsequently, the overcoat layer OC is formed on the entire surface of the second substrate 100b including the red, green, and blue color filter layers 111a, 111b, and 111c, thereby planarizing the step coverage of the color filter layers 111a, 111b, and 111c.

Figure 11D:
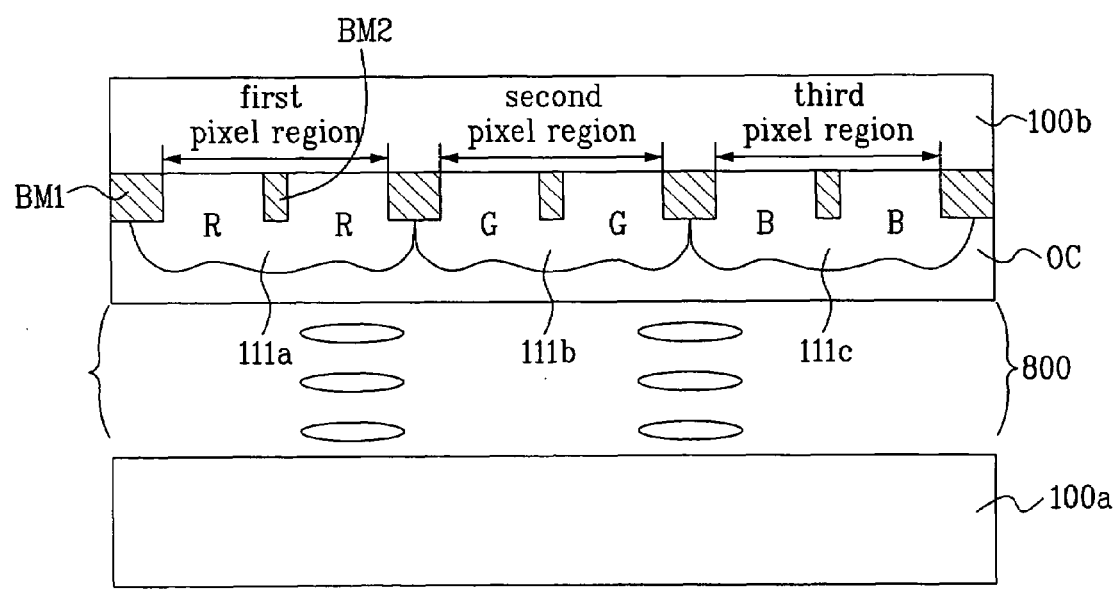

As shown in FIG. 11D, the completed second substrate 100b is bonded to the first substrate 100a, and then the bonded first and second substrates 100a and 100b are cut into the unit LCD panels. After that, the liquid crystal layer 800 is formed between the first and second substrates 100a and 100b in each of the LCD panels, thereby fabricating the LCD device.

As mentioned above, the LCD device according to the present invention and the exemplary method for fabricating the same have the following advantages.

In the LCD device according to the present invention, the second black matrix layer is formed on the center of the unit pixel region of the second substrate in the portion for the LCD panel of the model having the large-sized unit pixel region. Accordingly, even though the plurality of LCD panels of the multi-models are formed on one mother substrate, it is possible to obtain the same height in the color filter layers of the LCD panels for the different models having the large-sized unit pixel region and the small-sized unit pixel region. That is, it is possible to the constant chromatic coordinates in the LCD devices of the different models formed on one mother substrate.

Also, in case of the IPS mode LCD device according to the present invention, the second black matrix layer is formed on the second substrate corresponding to the common electrode of the first substrate, so that it is possible to prevent the aperture ratio from being lowered.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A liquid crystal display (LCD) device comprising:
   first and second substrates in which with LCD panels of first and second models are designed, the first model having a plurality of first pixel regions, the second model having a plurality of second pixel regions, wherein the first pixel regions are larger than the second pixel regions;
   a first black matrix layer on the second substrate for the first and second models except the pixel regions;
   a second black matrix layer on the center of each first pixel region of the second substrate; and
   a color filter layer on the second substrate of the pixel regions for the first and second models.

2. The LCD device of claim 1, wherein the second black matrix layer is connected with the first black matrix layer to form one body with the first black matrix layer.

3. The LCD device of claim 1, further comprising a common electrode on an entire surface of the second substrate including the first and second black matrix layers and the color filter layer.

4. The LCD device of claim 1, further comprising an overcoat layer on the entire surface of the second substrate including the first and second black matrix layers and the color filter layer.

5. A liquid crystal display (LCD), comprising:
first and second substrates in which LCD panels of first and second models are designed, the first model having a plurality of first pixel regions, the second model having a plurality of second pixel regions, wherein the first pixel regions are larger than the second pixel regions;
a first black matrix layer on the second substrate for the first and second models except the pixel regions;
a second black matrix layer on the center of each first pixel region of the second substrate; and
a color filter layer on the second substrate of the pixel regions for the first and second models,
wherein the first substrate includes:
a plurality of gate and data lines crossing each other to define the plurality of pixel regions,
a plurality of thin film transistors at respective crossing portions of the plurality of gate and data lines,
a plurality of common electrodes in each pixel region, and
a plurality of pixel electrodes connected with a drain electrode of the thin film transistor and formed between the common electrodes in parallel, and
wherein the second black matrix layer is formed on the second substrate corresponding to the common electrode.

6. A method for fabricating a LCD device forming LCD panels of a first model for a large-sized unit pixel region, and of a second model for a small-sized unit pixel region, on the same substrate, comprising:
preparing first and second substrates in which a plurality of pixel regions are defined;
forming a first black matrix layer on the second substrate except the pixel regions in the portion for the LCD panels of the first and second models, and a second black matrix layer on the center of each pixel region of the second substrate in the portion for the LCD panel of the first model;
forming a color filter layer in each pixel region of the second substrate of the first and second models;
bonding the first and second substrates to each other;
cutting the bonded first and second substrates into the LCD panels of the first and second models; and
forming a liquid crystal layer between the first and second substrates in each of the cut LCD panels.

7. The method of claim 6, wherein the first black matrix layer is formed as one body with the second black matrix layer, and the first and second black matrix layers are formed of chrome or resin.

8. The method of claim 6, further comprising forming a common electrode on an entire surface of the second substrate including the first and second black matrix layers and the color filter layer.

9. The method of claim 6, further comprising forming an overcoat layer on the entire surface of the second substrate including the first and second black matrix layers and the color filter layer.

10. The method of claim 6, wherein the color filter layer is formed to cover the second black matrix layer.

11. A method for fabricating a LCD device forming LCD panels of a first model for a large-sized unit pixel region, and of a second model for a small sized unit pixel region, on the same substrate, comprising:
preparing first and second substrates in which a plurality of pixel regions are defined;
forming a first black matrix layer on the second substrate except the pixel regions in the portion for the LCD panels of the first and second models, and a second black matrix layer on the center of each pixel region of the second substrate in the portion for the LCD panel of the first model;
forming a color filter layer in each pixel region of the second substrate of the first and second models;
bonding the first and second substrates to each other;
cutting the bonded first and second substrates into the LCD panels of the first and second models;
forming a liquid crystal layer between the first and second substrates in each of the cut LCD panels; and
forming a pixel electrode and a common electrode in parallel with each other within the pixel region of the first substrate,
wherein the second black matrix layer is formed on the second substrate corresponding to the common electrode of the first substrate.

* * * * *